(No Model.)

C. E. DURYEA.
VEHICLE TIRE.

No. 548,117. Patented Oct. 15, 1895.

Witnesses;
Sidney P. Hollingsworth
K. H. Bander.

Inventor;
Charles E. Duryea
by his attorney;

UNITED STATES PATENT OFFICE.

CHARLES E. DURYEA, OF PEORIA, ILLINOIS, ASSIGNOR TO THE INDIANA RUBBER AND INSULATED WIRE COMPANY, OF MARION, INDIANA.

VEHICLE-TIRE.

SPECIFICATION forming part of Letters Patent No. 548,117, dated October 15, 1895.

Application filed November 28, 1894. Serial No. 530,248. (No model.)

*To all whom it may concern:*

Be it known that I, CHARLES E. DURYEA, a citizen of the United States, residing at Peoria, in the county of Peoria and State of Illinois, have invented certain new and useful Improvements in Vehicle-Tires; and I do hereby declare the following to be a full, clear, and exact description of the invention, such as will enable others skilled in the art to which it appertains to make and use the same.

The invention forming the subject of this application relates to that class of pneumatic tires for wheels which are held upon a vehicle rim or felly by a circumferential gripping or constrictive action due to the pressure of air contained within said tires. Heretofore, so far as I am aware, tires constructed to act upon this principle have been dependent upon either the fixed length of the tread portion of the tire—that is, upon the part which comes in contact with the ground—or upon a bias or diagonal-thread restraining fabric, which becomes slightly larger in diameter and correspondingly shorter upon distension, for their grip upon the rim when inflated. This construction brings great circumferential surface strain upon the tread of the tire and not only renders it less resilient, but tends to cause it to wear rapidly.

The tire forming a part of the subject-matter of this invention differs from others of its class in that the tread portion is free to stretch longitudinally or lengthen, thus relieving it of much strain and prolonging its usefulness, at the same time rendering said tread very sensitive, so that it will yield freely to obstructions, reducing jar or vibration in the machine to a minimum.

The object of the invention is to so construct a tire or tire-shoe as to cause the base or inner circumference of the tire to tightly grip or press radially against a vehicle rim or felly upon inflation without dependence upon a fixed length of tread or a constrictive fabric.

To this end the invention consists in the matters to be described in the ensuing specification and particularly set forth in the claims at the close thereof.

Figure 1:
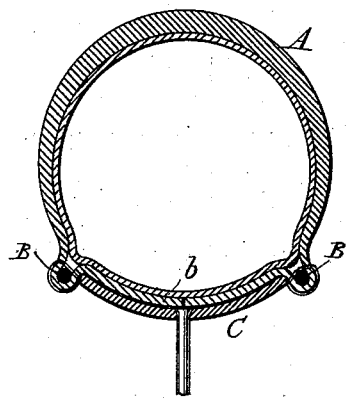
Figure 2:
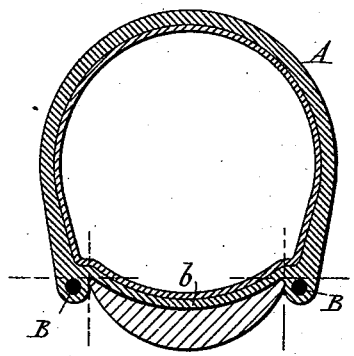
Figure 3:
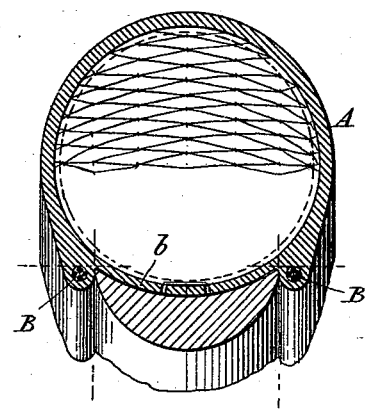

In the accompanying drawings, Figure 1 is a transverse section of a tire embodying my improvements. Fig. 2 is a similar view showing the rings embedded in a tire-cover and positioned outside and below the edges of the rim. Fig. 3 is a similar view showing the tire-cover as provided with a longitudinally extensible fabric.

The improvements herein described may be used in conjunction with either the common forms of "hose-pipe" tires or "double-tube" tires, though shown in the drawings in connection with the shoe of a double-tube tire.

In carrying out my invention I attach to or incorporate with the tire-shoe A a pair of endless bands or rings B, of wire or suitable non-stretching material, said bands or rings B being located near the base of the shoe—that is to say, near that part of the shoe which rests upon or within the rim C of a wheel. These rings are secured at such distance apart that when the tire is applied to the rim and inflated the rings will lie adjacent to or against the opposite edges of the rim, as shown, and constitute non-stretching bands at such points. Owing to this construction, it will be seen that the shoe A cannot elongate or stretch circumferentially at the points where the rings B are attached or incorporated, and as all the tire-shoes are constructed to limit stretching or enlargement laterally by the employment of a suitable restraining fabric the action of air-pressure within the tire will distend the same into circular form cross-sectionally.

In tires constructed in accordance with my invention the best results are attained when the tires are so proportioned with relation to the diameter of the rims with which they are to be used that the base $b$ thereof will be when inflated of somewhat less diameter than the smallest exterior diameter of the rim, so that upon seating a tire upon a rim the inflation of said tire will tend to distend the tire as a whole into circular form cross-sectionally, and so thrust the base $b$ thereof forcibly into contact with the rim throughout the entire circumference of the latter.

With the form of shoe shown in Fig. 1—that is, a shoe the base of which is divided to afford access to the inner or air tube at any point—the meeting edges of the shoe are laced or otherwise secured together, so that the rings B are maintained at a given distance apart by this means, while in the form shown in Fig. 3—that is, in which the cover or shoe has one or more longitudinal slits in the base through which the inner tube may be inserted or drawn out—the rings B are retained at the required distance apart by the base of the shoe throughout the greater part of the circumference thereof, lacings or fastenings being only used to close the slits or openings where they occur. The tire so constructed may be applied to any crescent, flat, or convex rim, because if the rim be diametrically of such size with respect to the rings that the base of the tire in its tendency to assume a circular form cross-sectionally is free to be forced against the rim the tire will be maintained therein whether the wires lie inside or outside, above, or below the edges of the rim. These rings insure the pressing of the base of the tire against the rim with a force due and proportionate to inflation. They also attach to an ordinary crescent rim as distinguished from the many special rims used with other fastenings and other modes of fastenings, (a feature of no small merit,) and although applicable to any construction of tread or of retaining fabric they are designed with special reference to holding tires constructed in accordance with my prior patent, No. 493,488, dated March 14, 1893, which tires differ from others known to me because they have no fixed length of tread circumferentially, which length all inflation-fastened tires known to me depend on to assist remaining in the rim.

As the rings B are of somewhat less diameter than the diameter of the rim-edges with which they lie in contact they afford a mechanical means for preventing any possibility of side slip or rolling of the tire, besides performing the function of preventing elongation of the tire circumferentially at points adjacent to the edges of the rim, while leaving the tread of the tire free to lengthen, as already explained. Moreover, the form illustrated in said figure is apt to meet with favor commercially, as the rings are accessible at all times and may be inspected without unseating the tire from the rim, and owing to their exposed location a glance suffices to show when they are in proper position. It being understood that as the rings are fixed to the tire or tire-cover their position with relation to the rim determines the proper position of the tire as a whole upon the rim.

I have found in practice that the grip of the tire upon the rim is more secure or positive if the cross-sectional arc of the rim departs somewhat from the arc naturally assumed by the base of the tire when inflated, though the hold of the tire is sufficiently firm for all practical uses provided the concave tire-groove of the rim be not so deep that the outward air-pressure in the tire is not sufficient to force the base of said tire into contact with the bottom of said groove.

Besides the fastening device for holding a tire in place on the rim, something is often necessary to prevent a certain wormlike action known as "creeping," by which the tire moves around the rim to the danger of cutting off the valve-tubes and otherwise injuring the tire. This I prevent by cementing to the rim a tacky or adherent band of cloth or other coating, (see Fig. 1,) so as to provide a fixed tacky or sticky surface for the tire to rest on, which prevents any creep or lengthwise movement, yet permits the tire to be removed for repair or other purposes and replaced again without the use of heat or a permanent cementing means. It is evident that a non drying or setting cement on the base of the tire would serve the same purpose.

To accommodate tires to rims slightly varying in diameter, the rings B may be made adjustable in any suitable way—as, for instance, the two ends of a wire used in making the rings B may be oppositely threaded and united by an ordinary turnbuckle.

It will be understood that in applying the non-extensible rings to the hose-pipe form of tire the base of the tire will itself maintain the rings at the proper distance apart, and this is also true of double-tube tires, in which the shoe or cover is provided with a laced slit to permit the air-tube to be drawn into or out of said cover. When applied to the form of cover or shoe in which the base is split throughout its circumference, the edges of the shoe should be connected at suitable intervals by lacing or otherwise in order to maintain the rings in proper position with relation to the edges of a rim.

I claim—

1. A pneumatic tire having non-extensible laterally immovable bands located at the sides of its base, and a connecting part or web between said bands, in combination with a rim located between the bands and made of greater exterior diameter than the smallest diameter of said bands, substantially as described.

2. A pneumatic tire having a tread free to lengthen after inflation, and provided with non-extensible bands incorporated in or attached to the tire at its base, in combination with a rim located between the bands and made of greater exterior diameter than the smallest diameter of the bands, and a connecting part or web of the tire extending across the rim between the bands to hold the same against lateral deflection, substantially as described.

3. A pneumatic tire comprising a flexible tube having two non-extensible laterally immovable bands incorporated in its side walls and extending longitudinally of the tube parallel with each other, in combination with a rim located between said bands in contact with the base of the tube, and made of greater exterior diameter than the smallest diameter of the bands, substantially as described.

4. A pneumatic tire tube comprising a tread free to lengthen after inflation, and a nonlengthening base having marginal inextensible bands laterally immovable in the wall of the tube, in combination with a rim fitting within the base between the marginal bands and made of greater external diameter than the smallest diameter of the bands, substantially as described.

In testimony whereof I affix my signature in presence of two witnesses.

CHARLES E. DURYEA.

Witnesses:
C. A. NEALE,
K. H. BANKS.